June 30, 1942.        H. A. SATTERLEE        2,287,835
APPARATUS FOR CONTROLLING ROTATION
Filed Dec. 23, 1940
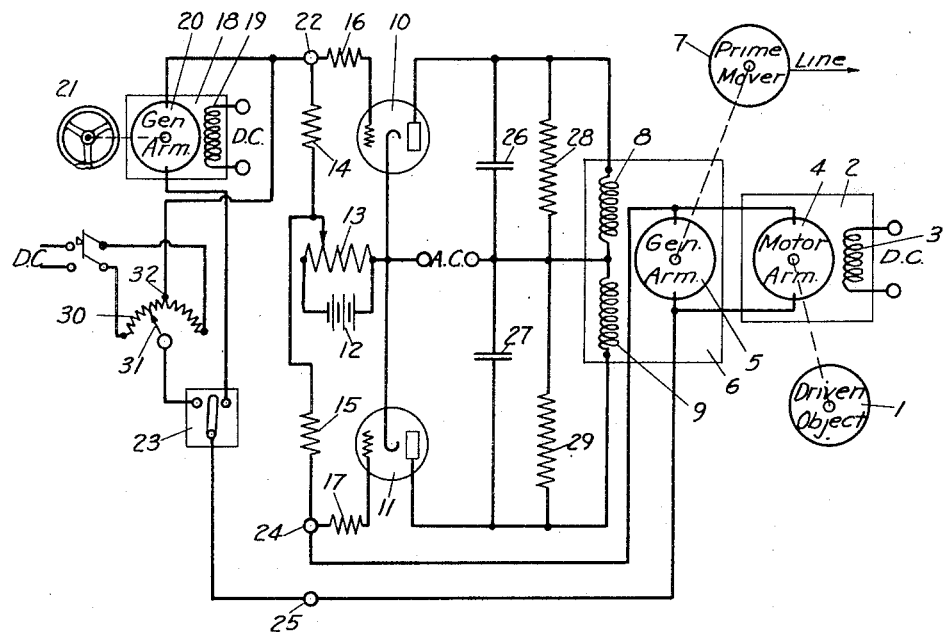
INVENTOR
Howard A. Satterlee
BY
ATTORNEY Patented June 30, 1942

2,287,835

UNITED STATES PATENT OFFICE 2,287,835

APPARATUS FOR CONTROLLING ROTATION

Howard A. Satterlee, Dayton, Ohio, assignor to Submarine Signal Company, Boston, Mass., a corporation of Maine Application December 23, 1940, Serial No. 371,332

12 Claims. (Cl. 172—239)

The present invention relates to motor speed control and remote positioning systems.

Various systems have heretofore been proposed for controlling the speed of a motor through a relatively wide range and also in the application of such systems to the control of the position of an object located at a point remote from the control point.

It is an object of the present invention to provide an improved system whereby the speed of the motor may be varied through a wide range of speeds while maintaining a substantially flat speed-torque characteristic and whereby the speed of the motor may be controlled from a remote point.

It is a further object of the present invention to provide a system whereby a remotely situated object may be rotated into any desired position from a conveniently located control point.

These and other objects of the present invention as well as the mode of operation of the same will best be understood from the following description taken in connection with the accompanying drawing which represents a schematic view of the invention.

As shown in the drawing the object 1 to be rotated is driven by a motor 2 having a separately excited direct current field winding 3 and an armature 4 which is supplied with energy from the armature 5 of a generator 6. The armature 5 is continuously rotated by a motor or other prime mover 7. The generator 6 is provided with two field windings 8 and 9 which, when excited with current of suitable polarity, provide magnetic flux in opposite directions so that when the winding 8 is energized, the polarity of the generator armature voltage will be in one direction; while when the field winding 9 is energized, the polarity of the generator armature voltage will be in the opposite direction. The generator field winding excitation circuit includes two grid controlled rectifiers 10 and 11 preferably of the gaseous type operating in a half-wave manner. The cathodes of the two rectifiers are tied together, the anode of each rectifier being connected to one terminal of one of the field windings 8 or 9, the other terminals of these windings being common and connected through a source of alternating current to the common cathode connection of the two rectifiers. The anode current of rectifier 10 thus supplies field winding 8 and the anode current of rectifier 11 supplies field winding 9. It is usually desirable to shunt each of the field windings with a filter such as the condensers 26 and 27 and the resistances 28 and 29. The condensers serve to increase the power factor of the field winding circuit so that the required field current can be obtained; the resistors serve to quench the high voltage which appears across the field windings when the rectifier tubes cut off. The grids of the rectifiers are normally biased to cut off by means of the biasing battery 12 and potentiometer 13 which is connected between the common cathode connection and through two resistances 14 and 15 to the grids of the two rectifiers 10 and 11, respectively. Current-limiting resistors 16 and 17 respectively are also inserted in series with the grids of the two tubes. The control circuit for the grids of the two rectifiers further includes in series a source of direct potential and the motor armature 4.

The direct controlling potential may be provided in several ways two of which are shown in Fig. 1. It may be provided, for example, by a generator 18 having an armature 20 and a permanent magnet field or a direct current excited electromagnet field 19. The armature 20 of the generator 18 may be manually rotated by means of the handwheel 21 connected to the armature shaft, through suitable gearing if desired. One terminal of the armature 20 is connected to the terminal 22 at the junction of resistors 14 and 16. The other terminal of the armature 20 is connected through a single-pole, double-throw switch 23 to one side of the motor armature 4. The other side of the motor armature 4 is connected to the terminal 24 which is at the junction of resistors 15 and 17. The connections are made in such a way that the motor armature voltage is in opposition to the voltage produced by the armature 20. The algebraic sum of these two voltages is thus impressed across the series connected resistors 14 and 15. These resistors are preferably made of a high value so that only a very small current flows through them. The grid circuit of rectifier 10 then includes the potential drop across resistor 14 and the biasing potential provided by potentiometer 13. Similarly, the grid circuit of rectifier 11 includes the potential drop across the resistor 15 in series with the biasing potential 12.

The operation of the system so far described is as follows: With the generator armature 5 being continuously rotated and the generator armature 20 at rest, the field windings 8 and 9 will receive no excitation. Consequently the generator armature 5 will produce no voltage and the motor 4 will remain at rest. When the handwheel 21 is rotated in one direction, say clockwise, the switch 23 being thrown to the right, the voltage produced by the armature 20 is all impressed across the terminals 22 and 24 causing a current to flow through the resistors 14 and 15. If we assume that the potential drop thereby created is such as to make the terminal 22 positive and the terminal 24 negative, the grid of rectifier 10 will have applied to it the algebraic sum of the drop across resistor 14 and the bias potential 13. Since these two under the assumed conditions of polarity oppose each other, the grid of rectifier 10 will become positive. If the potential drop across resistor 14 is sufficiently large, rectifier 10 will pass current exciting the field winding 8. The generator armature 5 will thereby generate a potential which is impressed across the motor armature 4 causing the latter to rotate. When the voltage generated by armature 5 becomes approximately equal to the voltage generated by armature 20, the grid of the tube 10 will again become negative, cutting off the further excitation of field winding 8 for a sufficient number of cycles to reduce the voltage of armature 5 to the point where the motor terminal voltage is again enough below the voltage of armature 20 to permit the rectifier 10 again to press current. It will be evident that the excitation of field winding 8 by the rectifier 10 will be just sufficient to generate in armature 5 a voltage just sufficient to drive the motor 4 at a speed proportional to the speed of the handwheel 21. Moreover, with the handwheel 21 being rotated at a constant speed, the motor 2 will run at a constant speed even though the load produced by the driven object 1 may vary.

It will be observed that when the potential across terminals 22 and 24 is such as to make the grid of tube 10 positive, the grid of tube 11 will be highly negative since the drop across the resistor 15 will be in such a direction as to increase the negative bias provided by potentiometer 13. The field winding 9 will therefore under these conditions remain deenergized.

If, now, the handwheel 21 be rotated in the counter-clockwise direction, the potential produced by armature 20 will reverse so that terminal 24 will become positive and terminal 22 negative. The grid of tube 11 therefore will be positive while the grid of tube 10 is negative; consequently field winding 9 will be excited whereas field winding 8 will be deenergized. The armature 5 will therefore produce a potential of opposite polarity, causing the motor armature 4 to reverse its direction of rotation. The speed of motor 4 will, however, again be proportional to the speed of the handwheel 21. In order to obtain a close proportionality between the speed of armature 4 and the speed of the handwheel 21, the armature 4 should have a low internal resistance so that the difference between the terminal voltage of armature 4 and its back EMF is as small as possible. Furthermore, it is desirable to design the generator 18 to produce a relttively high voltage substantially equal to that required by the motor 2 when operating at full speed. The armature 20 should produce this voltage when the handwheel 21 is being rotated at a convenient speed.

The effect of the above arrangement is to produce a very close coupling between the handwheel 21 and the driven object 1, for the back coupling between the motor 2 and the grid control potential for the tubes 10 and 11 substantially eliminates all elasticity from the system.

Thus, if the handwheel be stopped abruptly, the grid-controlling potential is only that existing across the motor terminals. The polarities of the grids of the tubes are therefore abruptly reversed, thereby reversing the field flux of generator 6 and causing it to reverse the polarity of generated potential, and tending to reverse the motor 2. Since, however, the grids have thereby again been reversed in polarity, the motor does not actually reverse, but rapidly comes to a standstill. The regenerative effect also tends to stop the system.

When the system is being used for the purpose of rotating the object 1 into a desired predetermined position, it may be desirable to provide at the location of the handwheel 21 a position repeater such as a conventional self-synchronous motor system which will indicate at the position of handwheel 21 the position of the driven object 1.

If it is desired to drive the object continuously in one direction or the other, there is substituted for the generator 18 a potentiometer 30. To this end the switch 23 is thrown to the left. The grid controlling potential impressed across terminals 22 and 25 and which is in series with the motor armature potential is then provided by the potentiometer 30 having a center tap 32 and a movable contact 31. The extremities of the potentiometer resistance 30 are connected across a source of direct current. It will be observed that the center tap 32 is connected to the terminal 22 and the movable contact 31 is connected to the terminal 25. Thus the portion of the potentiometer between the center tap 32 and the movable contact 31 is in series with the motor armature 4 and the resulting potential is impressed across terminals 22 and 24. It will now be evident that when the movable contact 31 is on one side of the center tap 32, the voltage drop in the potentiometer 30 will be in such a direction as to tend to make one of the rectifier grids positive and the other negative; while when the contact 31 is on the other side of the center tap 32, the polarities of the grids will be reversed. The direction of rotation of the motor 2 can thus be selected at will. It will also be observed that the magnitude of the control potential provided by the potentiometer can be varied merely by varying the position of movable contact 31 whereby the speed of the motor 2 can be varied at will. For any given setting of the contact 31, the motor 2 will maintain a constant speed regardless of the variations in the load driven by the motor by reason of the back coupling of the motor armature in the rectifier grid circuits as described above. The motor can also be rapidly stopped by moving contact 31 to the center point 32.

Having now described my invention, I claim:

1. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier and by its center tap to the common cathode connection and means for impressing a controlled potential across said resistor comprising a source of direct potential controllable in polarity and magnitude connected in series with the motor armature.

2. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier and by its center tap to the common cathode connection and means for impressing a controlled potential across said resistor comprising a source of direct potential controllable in polarity and magnitude connected in series with the motor armature in a direction to make the polarity of the potential across the rotating motor armature opposite to the polarity of said controllable potential.

3. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier, a source of grid bias potential connected by its positive terminal to said common cathode connection and by its negative terminal to said center tap, said bias potential being adjusted, in the absence of other grid potentials, to cut off conduction through both rectifiers and means for impressing a control potential across said resistor comprising a source of direct potential controllable in polarity and magnitude connected in series with the motor armature.

4. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier and by its center tap to the common cathode connection and means for impressing a control potential across said resistor comprising a manually operated direct current generator having a separately excited field and an armature connected in series with said motor armature.

5. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier and by its center tap to the common cathode connection and means for impressing a control potential across said resistor comprising a manually operated direct current generator having a separately excited field and an armature connected in series with said motor armature, the manually operated generator being designed to produce at a convenient maximum speed of rotation a potential substantially equal to the full-load, full-speed potential across said motor armature.

6. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier and by its center tap to the common cathode connection and means for impressing a control potential across said resistor comprising a center-tapped potentiometer having a movable contact, the extremities of said potentiometer being connected across a source of direct potential, the center tap being connected to one end of the center-tapped resistor and the movable contact being connected in series with said motor armature to the other end of said center-tapped resistor.

7. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier and by its center tap to the common cathode connection and means for impressing a controlled potential across said resistor comprising a source of direct potential controllable in polarity and magnitude connected in series with the motor armature and a resistor and a condenser connected in parallel across each of said generator field windings.

8. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier, a source of grid bias potential connected by its positive terminal to said common cathode connection and by its negative terminal to said center tap, said bias potential being adjusted in the absence of other grid potentials to cut off conduction through both rectifiers and means for impressing a control potential across said resistor comprising a manually operated direct current generator having a separately excited field and an armature connected in series with said motor armature in a direction to make the polarity of the potential across the rotating motor armature opposite to the polarity of the simultaneously rotating manually operated generator.

9. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a center-tapped resistor connected by one end to the grid of one rectifier and by the other end to the grid of the other rectifier, a source of grid bias potential connected by its positive terminal to said common cathode connection and by its negative terminal to said center tap, said bias potential being adjusted in the absence of other grid potentials to cut off conduction through both rectifiers and means for impressing a control potential across said resistor comprising a manually operated direct current generator having a separately excited field and an armature connected in series with said motor armature in a direction to make the polarity of the potential across the rotating motor armature opposite to the polarity of the simultaneously rotating manually operated generator, the manually operated generator being designed to produce at a convenient maximum speed of rotation a potential substantially equal to the full-load, full-speed potential across said motor armature.

10. In combination, a prime mover, a direct current machine mechanically driven thereby and having a pair of balanced field windings, a pair of grid-controlled rectifier tubes having their cathodes connected through an alternating current power source to the common junction between the windings and their anodes to the other terminals of said windings, and a series circuit including two opposed reversible generating sources one of which is manually controlled and the other of which is the armature of said direct current machine, said circuit having a common point connected to said cathodes and impedance devices on opposite sides thereof connected to said control grids for controlling the potentials thereof.

11. In combination, a prime mover, a direct current generator mechanically driven thereby and a field excitation circuit for said generator including a pair of grid-controlled rectifier tubes connected with an alternating current power source and with said generator field so that the current through one field will produce a magnetic field in one direction and current through the other tube will produce a magnetic field in the opposite direction, a series circuit including two opposed potential sources, one of which is said direct current machine and means connected to said circuit for simultaneously impressing upon said control grid potentials of opposite polarity respectively, the said polarities being determined by the polarity of the potential difference between said potential sources.

12. A variable speed motor system comprising a motor having an armature, a generator for supplying power to said motor and having a continuously driven armature and two field windings, a pair of gaseous grid-controlled rectifiers, one of said rectifiers being connected to supply current from an alternating source to one of said field windings to provide a flux in one direction and the other rectifier being connected to supply current to the other field winding to provide a flux in the other direction and a grid circuit for said rectifiers including a common cathode connection, a tapped resistor connected by one end to the grid of one rectifier and by the other end to the grid of the other rectifier and by its tap to the common cathode connection and means for impressing a controlled potential across said resistor comprising a source of direct potential controllable in polarity and magnitude connected in series with the motor armature.

HOWARD A. SATTERLEE.